(12) United States Patent
Higashi et al.

(10) Patent No.: US 10,565,756 B2
(45) Date of Patent: Feb. 18, 2020

(54) COMBINING DRAWING MEDIA TEXTURE AND IMAGE DATA FOR DISPLAY WHILE MAINTAINING THE DYNAMIC RANGE OF THE ORIGINAL IMAGE

(71) Applicant: EIZO Corporation, Ishikawa (JP)

(72) Inventors: Masafumi Higashi, Ishikawa (JP); Reo Aoki, Ishikawa (JP); Yuya Yoshida, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 0 days.

(21) Appl. No.: 15/531,569

(22) PCT Filed: Dec. 1, 2014

(86) PCT No.: PCT/JP2014/081690
§ 371 (c)(1),
(2) Date: May 30, 2017

(87) PCT Pub. No.: WO2016/088161
PCT Pub. Date: Jun. 9, 2016

(65) Prior Publication Data
US 2017/0330360 A1 Nov. 16, 2017

(51) Int. Cl.
*H04N 9/31* (2006.01)
*G06T 11/00* (2006.01)
(Continued)

(52) U.S. Cl.
CPC ............ *G06T 11/60* (2013.01); *G06T 11/001* (2013.01); *H04N 1/387* (2013.01); *H04N 1/40* (2013.01);
(Continued)

(58) Field of Classification Search
None
See application file for complete search history.

(56) References Cited

U.S. PATENT DOCUMENTS

| 5,294,989 A * | 3/1994 | Moore .................. H04N 9/646 348/241 |
| 2002/0076116 A1* | 6/2002 | Eschbach ................. G06T 5/10 382/260 |

(Continued)

FOREIGN PATENT DOCUMENTS

| JP | 2012-230635 A | 11/2012 |
| JP | 2013-210709 A | 10/2013 |

OTHER PUBLICATIONS

Chen et al.; "Single image based illumination estimation for lighting virtual object in real scene;" IEEE 12th International Conference on Computer-Aided Design and Computer Graphics; Sep. 15-17, 2011; Jinan, China; pp. 450-455 (Year: 2011).*

(Continued)

*Primary Examiner* — Edward Martello
(74) *Attorney, Agent, or Firm* — Maier & Maier, PLLC

(57) ABSTRACT

Provided is an image combination method that can represent the texture of a drawing medium such as paper without causing a foreground fading problem. The image combination method includes a step of acquiring an illumination-light component and a reflectance component from an input image, a step of generating a texture-combined image by combining the reflectance component or the corrected reflectance component and a texture image representing a desired texture, and a step of acquiring a combined image by combining the illumination-light component or the corrected illumination-light component and the texture-combined image.

3 Claims, 1 Drawing Sheet

(51) Int. Cl.
    *G06T 11/60*     (2006.01)
    *H04N 1/40*     (2006.01)
    *H04N 1/387*     (2006.01)
    *H04N 1/60*     (2006.01)
    *H04N 9/68*     (2006.01)
    *H04N 9/77*     (2006.01)

(52) U.S. Cl.
    CPC ............ *H04N 1/6086* (2013.01); *H04N 9/31* (2013.01); *H04N 9/3182* (2013.01); *H04N 9/3194* (2013.01); *H04N 9/68* (2013.01); *H04N 9/77* (2013.01)

(56) References Cited

U.S. PATENT DOCUMENTS

| | | | | |
|---|---|---|---|---|
| 2003/0012448 A1* | 1/2003 | Kimmel | ............... | G06K 9/4661 382/274 |
| 2008/0101719 A1* | 5/2008 | Lim | ................... | H04N 1/4072 382/274 |
| 2014/0125659 A1* | 5/2014 | Yoshida | ............... | G06T 15/506 345/419 |
| 2015/0123985 A1 | 5/2015 | Abe et al. | | |

OTHER PUBLICATIONS

Funt et al.; "Retinex in MATLAB;" SPIE Journal of Electronic Imaging / Jan. 2004 / vol. 13(1) pp. 48-57 (Year: 2004).*

Kimmel et al.; "A Variational Framework for Retinex;" International Journal of Computer Vision 52(1), pp. 7-23, 2003; Kluwer Academic Publishers; The Netherlands (Year: 2003).*

International Search Report dated Jan. 20, 2015 in corresponding Application No. PCT/JP2014/081690; 1 pg.

Hiromi Takahashi et al., "Separation of irradiance from observed color images by logarithmic nonlinear diffusion process", IEICE Technical Report, vol. 105, No. 609, ITS2005-79~109 ITS, Feb. 14, 2006 (Feb. 14, 2006), vol. 105, No. 609, pp. 13 to 18, 8 pgs.

* cited by examiner

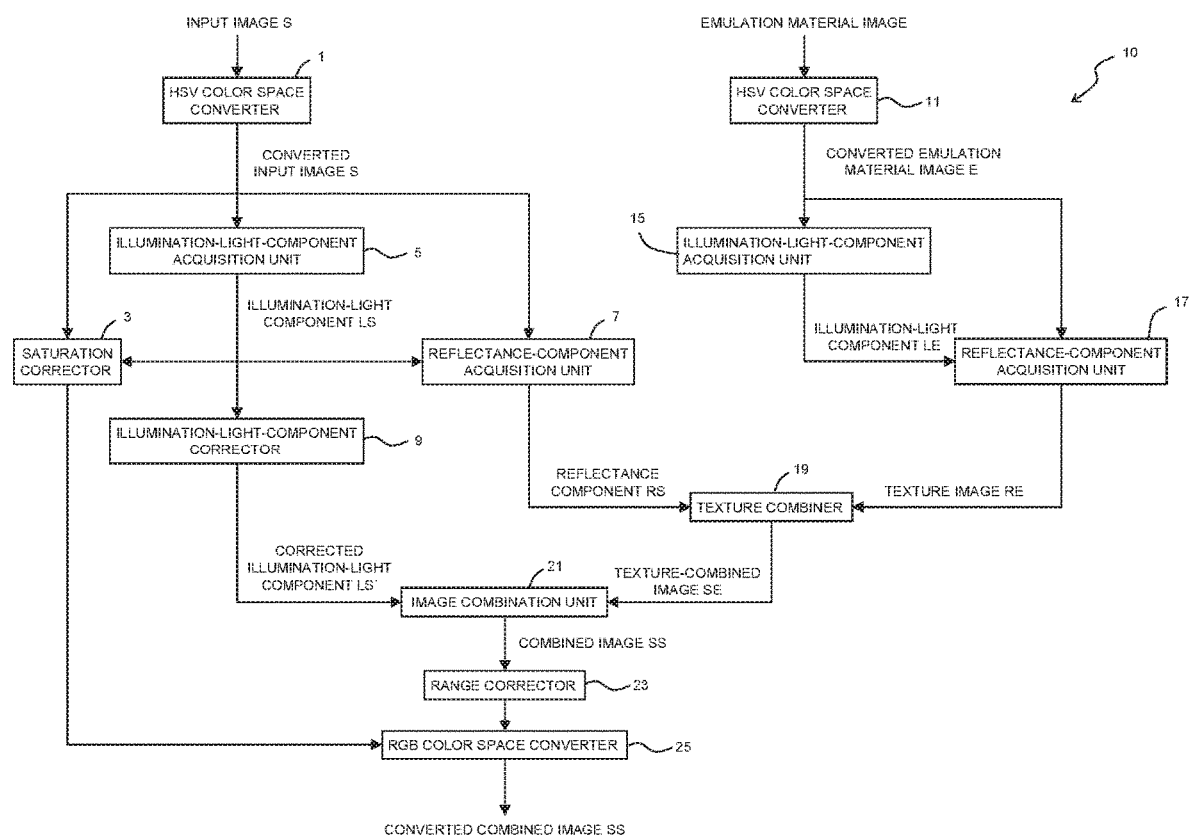

COMBINING DRAWING MEDIA TEXTURE AND IMAGE DATA FOR DISPLAY WHILE MAINTAINING THE DYNAMIC RANGE OF THE ORIGINAL IMAGE

TECHNICAL FIELD

The present invention relates to an image combination method and device that acquire a combined image by combining an input image with a texture image representing a desired texture, and an image display method and device and image projection system that display the acquired combined image.

BACKGROUND ART

Among conventional technologies that represent the appearance (texture) such as "wrinkles" or "unevenness" of a drawing medium such as paper on a display is Patent Literature 1. Patent Literature 1 generates a combined image by alpha-blending a target image and a filter image. At this time, a loss occurs in the dynamic range of the original image. For this reason, Patent Literature 1 reproduces the dynamic range by converting gradations in an LUT converter to compensate for the loss.

CITATION LIST

Patent Literature

[Patent Literature 1] Japanese Unexamined Patent Application Publication No. 2012-230635

SUMMARY OF INVENTION

Technical Problem

However, with regard to the method of Patent Literature 1, for example, if the filter image is patchy, pixels having the same gradation value in the target image would have different gradation values in a combined image. Consequently, when the gradations in the combined image are converted, the dynamic range of the original image would be reproduced in some pixels but would not be reproduced in the remaining pixels, thereby disadvantageously fading the foreground such as characters.

The present invention has been made in view of the foregoing, and an object thereof is to provide an image combination method that allows for the representation of the texture of a drawing medium such as paper without causing a foreground fading problem.

Solution to Problem

The present invention provides an image combination method including a step of acquiring an illumination-light component and a reflectance component from an input image, a step of generating a texture-combined image by combining the reflectance component or corrected reflectance component and a texture image, wherein the texture image represents a desired texture, and a step of acquiring a combined image by combining the illumination-light component or corrected illumination-light component and the texture-combined image.

The method of the present invention allows for the representation of the texture of a drawing medium by generating the texture-combined image by combining the reflectance component of the input image and the texture image representing the predetermined texture and then generating the combined image by combining the texture-combined image and the illumination-light component of the input image. According to this method, the texture of the drawing medium can be incorporated into the combined image without nearly affecting or affecting the illumination-light component, which relates to the dynamic range of the input image. Thus, the texture of the drawing medium can be represented on the combined image without nearly causing or causing a foreground fading problem.

The method of the present invention can be used to represent the texture of a drawing medium on a display, as well as can be used to reduce the influence of the texture of a screen on which an image is projected using a projector.

Various embodiments of the present invention are described below. The embodiments below can be combined with each other.

Preferably, the texture image consists of a reflectance component of a desired emulation material image.

Another aspect of the present invention provides an image display method including a step of displaying, on a display, the combined image acquired using the image combination method.

Another aspect of the present invention provides an image display method including a step of displaying, on a screen, the combined image acquired using the image combination method by projecting the combined image on the screen using a projector. The texture image is a reflectance component of an image of the screen, and the texture-combined image is acquired by combining the reflectance component and the texture image at a ratio of 1:$\alpha$, $\alpha$ being less than 0.

Another aspect of the present invention provides an image combination device including an illumination-light-component acquisition unit configured to acquire an illumination-light component from an input image, a reflectance-component acquisition unit configured to acquire a reflectance component from the input image, a texture combiner configured to generate a texture-combined image by combining the reflectance component or corrected reflectance component and a texture image, wherein the texture image represents a desired texture, and an image combiner configured to acquire a combined image by combining the illumination-light component or corrected illumination-light component and the texture-combined image.

Another aspect of the present invention provides an image display device including the image combination device and a display that displays the combined image.

Another aspect of the present invention provides an image combination device including an illumination-light-component acquisition unit configured to acquire an illumination-light component from an input image, a reflectance-component acquisition unit configured to acquire a reflectance component from the input image, and an image combiner configured to acquire a combined image by combining the reflectance component or the corrected reflectance component, a texture image representing a desired texture, and the illumination-light component or the corrected illumination-light component.

BRIEF DESCRIPTION OF THE DRAWINGS

FIG. 1 is a block diagram of an image combination device of an embodiment of the present invention.

DETAILED DESCRIPTION

Now, an embodiment of the present invention will be described with reference to the drawings. Various features described in the embodiment below can be combined with each other.

An image combination method of an embodiment of the present invention includes a step of acquiring an illumination-light component LS and a reflectance component RS from an input image S, a step of generating a texture-combined image SE by combining the reflectance component RS or the corrected reflectance component and a texture image RE representing a desired texture, and a step of acquiring a combined image SS by combining the illumination-light component LS or the corrected illumination-light component LS' and the texture-combined image SE.

While this image combination method may be performed by any configuration, it can be performed by an image combination device 10 shown in FIG. 1. Hereafter, the image combination method of the present embodiment will be described through the description of the image combination device 10.

(1) Conversion of Input Image

The input image S inputted to the image combination device 10 is first inputted to an HSV color space converter 1. The HSV color space converter 1 converts the RGB color space of the input image into HSV color space. The RGB color space is converted into HSV color space using a typical conversion formula. Use of HSV color space allows for the elimination of saturation reduction effects caused by the adjustment of brightness using YUV color space and for visually favorable brightness correction. If RGB channels are independently processed as seen in Patent Literature 1, color drift may occur; in the present embodiment, the RGB color space of the input image is converted into HSV color space and then the V component (lightness component) alone is processed, thereby preventing color drift. Note that if the input image is represented by HSV color space, the HSV color space converter 1 need not be provided. Also, the present invention may be applied to any type of color space other than HSV color space. However, a color space whose lightness or luminance can be changed independently of the color components is preferred in terms of the prevention of color drift. In addition to HSV color space, HLS color space is preferred.

(2) Acquisition of Illumination-light Component and Reflectance Component

The converted input image S is inputted to a saturation corrector 3, an illumination-light-component acquisition unit 5, and a reflectance-component acquisition unit 7.

The illumination-light-component acquisition unit 5 is an edge-preserving low-pass filter and acquires the illumination-light component LS by calculating the weighted average of local brightness of the input image S. The illumination-light component LS is inputted to the saturation corrector 3, an illumination-light component corrector 9, and the reflectance-component acquisition unit 7.

The saturation corrector 3 calculates a correction value for correcting the saturation of a low-gradation region, on the basis of the input image S and illumination-light component LS. If saturation correction is not needed, the saturation corrector 3 may be omitted.

The illumination-light component corrector 9 corrects the gradation of the illumination-light component LS and outputs the corrected illumination-light component LS'. Specifically, it corrects the gradation of the illumination-light component LS by emphasizing a low-gradation component of the illumination-light component LS as disclosed in Japanese Unexamined Patent Application Publication No. 2013-210709. In the present embodiment, the illumination-light component corrector 9 is not essential and may be omitted if the illumination-light component LS need not be corrected.

The reflectance-component acquisition unit 7 acquires the reflectance component RS of the input image S on the basis of the Retinex theory. Details of the Retinex theory are described in Japanese Unexamined Patent Application Publication (Translation of PCT Application) No. 2005-515515 and the like. According to the Retinex theory, the following relationship holds true: input image S=illumination-light component LS×reflectance component RS. The reflectance-component acquisition unit 7 calculates the log value (log RS) of the reflectance component RS from the log difference between the input image S and illumination-light component LS on the basis of this relationship and acquires the reflectance component RS from this log value. Note that the reflectance-component acquisition unit 7 need not necessarily acquire the reflectance component RS using the method described above. For example, the reflectance-component acquisition unit 7 may directly acquire the reflectance component RS from the input image S by applying a high-pass filter to the input image S. The acquired reflectance component RS may be directly inputted to a texture combiner 19, or may be subjected to a predetermined correction process and then inputted to the texture combiner 19. Specifically, this correction process is performed by increasing the amplitude of the reflectance component as disclosed in Japanese Unexamined Patent Application Publication No. 2013-210709.

(3) Generation of Texture-Combined Image

The texture combiner 19 generates the texture-combined image SE by combining the reflectance component RS and the texture image RE representing the desired texture.

In the present embodiment, the texture image RE consists of a reflectance component of an emulation material image E, which is an image of a drawing medium such as paper. The texture image RE can be acquired using a method similar to the method of acquiring the reflectance component RS from the input image S. Specifically, first, the emulation material image E is inputted to an HSV color space converter 11 to convert the RGB color space of the emulation material image E into HSV color space; then, an illumination-light-component acquisition unit 15 acquires an illumination-light component LE of the emulation material image E; and then, a reflectance-component acquisition unit 17 acquires a reflectance component of the emulation material image E from the log difference between the emulation material image E and illumination-light component LE. This reflectance component represents the texture of the emulation material image E and can be used as the texture image RE.

The emulation material image E may be acquired from the storage of the image combination device 10, or may be acquired from an external computer, or may be acquired from a camera mounted on the image combination device 10. The acquisition of the emulation material image E from a camera advantageously allows various materials to be followed in real time.

Instead of acquiring the emulation material image E, the image combination device 10 may acquire the texture image RE. For example, the texture image RE may be acquired as follows: an independent texture image RE generator is provided; a texture image RE is generated from an emulation material image E using this generator; the generated texture image RE is stored in the storage of the image combination device 10; and the image combination device 10 reads the texture image RE from the storage and uses it when necessary. In this case, the image combination device 10 need not include the HSV color space converter 11, illumination-light-component acquisition unit 15, or reflectance-component acquisition unit 17.

For example, the texture combiner 19 may combine the reflectance component RS and texture image RE on the basis of the following Formula 1:

Texture-combined image $SE$=reflectance component $RS$+α×texture image $RE$     Formula 1

In Formula 1, α is a parameter, and the value thereof may be changed as appropriate in accordance with the use. To display the combined image SS (to be discussed later) on a display in such a manner that the texture of a drawing medium such as paper is appropriately represented on the display, α is preferably more than 0, more preferably more than 0.5. By setting α to 1 or more, the texture can be emphasized compared to that of the texture image RE. The upper limit of α may be any value and is, for example, 2, 3, 4, or 5.

The combined image SS can be projected on a screen using a projector. The screen here refers to any object on which the combined image SS is projected and may be a dedicated screen for projection or may be a wall surface of a building. In this case, the texture image RE is a reflectance component of an image of the screen. By setting α to less than 0 (preferably, less than −0.5, more preferably, −1), the influence of the texture of the screen can be reduced. Even if different screens are used, the same appearance can be obtained. The lower limit of α may be any value and is, for example, −2, −3, −4, or −5. The texture image RE may be acquired from a previously captured screen image, or may be acquired from a screen image captured in real time using a camera. Note that to effectively reduce the influence of the texture of the screen, it is necessary to match the positions of recesses and protrusions of the texture image RE reflected on the combined image SS to the positions of the recesses and protrusions of the screen on which the combined image SS is projected. Accordingly, it is preferred to acquire a texture image RE from a screen image captured in real time using a camera.

(4) Generation of Combined Image, Range Correction, and Conversion of Color Space An image combiner 21 generates the combined image SS by combining the corrected illumination-light component LS' and the texture-combined image SE. This combination may be performed in accordance with the following Formula 2 on the basis of the Retinex theory:

Combined image $SS$=corrected illumination-light component $LS'$×texture-combined image $SE$     Formula 2

In the method of the present embodiment, the illumination-light component LS of the input image S is only subjected to gradation correction and is not combined with the texture image RE. For this reason, the dynamic range of the combined image SS obtained using the method of the present embodiment is approximately the same as the dynamic range of the input image S. As a result, a foreground fading problem hardly occurs or does not occur at all. Note that the combination of the reflectance component RS of the input image S and the texture image RE may slightly narrow the dynamic range of the combined image SS. For this reason, it is preferred to correct the dynamic range in a range corrector 23 so that the dynamic range of the combined image SS becomes the same as the dynamic range of the input image S.

Subsequently, an RGB color space converter 25 converts the HSV color space of the range-corrected combined image SS into RGB color space and outputs the resulting combined image SS. In this conversion process, the saturation of the low-gradation region may be corrected on the basis of the correction value calculated by the saturation corrector 3.

The combined image SS obtained using the above method may be displayed on a display. In this case, an image display device including the image combination device 10 and a display that displays the combined image SS is provided.

The combined image SS may also be projected on a screen using a projector. In this case, an image projection system including the image combination device 10 and a projector that projects the combined image SS on a screen is provided.

The present invention may be carried out in the following aspects.

While, in the above embodiment, the texture combiner 19 and image combiner 21 are provided as different elements, the image combiner 21 may acquire the combined image SS by combining the reflectance component RS, texture image RE, and corrected illumination-light component LS'. In this case also, the combined image SS can be generated on the basis of Formulas 1 and 2. Also, the corrected reflectance component may be used in place of the reflectance component RS. Also, the illumination-light component LS, which has yet to be corrected, may be used in place of the corrected illumination-light component LS'.

The invention claimed is:

1. An image combination device comprising:
   an illumination-light-component acquisition unit configured to acquire an illumination-light component from an input image;
   a reflectance-component acquisition unit configured to acquire a reflectance component from the input image based on the following relationship according to the Retinex theory: input image S=illumination-light-component LS×reflectance component RS;
   a texture combiner configured to generate a texture-combined image by combining the reflectance component or corrected reflectance component and a texture image, wherein the texture image represents a desired texture; and
   an image combiner configured to acquire a combined image by combining the illumination-light component or corrected illumination-light component and the texture-combined image, and
   wherein, with the illumination-light-component acquisition unit and the reflectance-component acquisition unit, the input image is separated into a low frequency component and a high frequency component, the low frequency component is the illumination-light-component, and the high frequency component is the reflectance-component.

2. An image display device comprising:
   the image combination device of claim 1; and
   a display that displays the combined image.

3. An image projection system comprising:
   the image combination device of claim 1; and
   a projector configured to project the combined image on a screen.

* * * * *